July 2, 1935.  F. BOCK  2,006,569

BRIDGE SUPPORT FOR EYEGLASS FRAMES

Filed Jan. 27, 1933

Inventor:

Fritz Bock

Patented July 2, 1935

2,006,569

UNITED STATES PATENT OFFICE 2,006,569

BRIDGE SUPPORT FOR EYEGLASS FRAMES

Fritz Bock, Berlin-Charlottenburg, Germany

Application January 27, 1933, Serial No. 653,999
In Germany January 30, 1932

6 Claims. (Cl. 88—55)

The present invention relates to eyeglass frames, which are provided with a peculiarly shaped support upon the frame bridge for the nasal bone, to omit their visible or painful marks and assuring exact seating.

The supports known heresofar for such purposes are either connected rigidly to the frame bridge or will permit only little adjustment. My invention effects a far better connection between the frame bridge of the eyeglass and the support, as the supporting form piece may be adjusted to the centre of bridge to fit snugly to the nasal bone in every plane, without altering the ortho-central position of the spectacles to the eyes of the bearer.

In the sense of my invention, the support of the bridge is made up as a suiting form piece to the nasal bone—in difficult cases by taking a mould of same—which can be adjusted in every direction, and which for this purpose is provided with a universal joint to be set with upon the bridge. In this way the support will bear nicely upon the nose in every respect, when the spectacles have been brought in proper position to the eye by careful examination. In order to hold the support in the wanted position lastingly, a fastening screw may be provided. Another advantage will be gained by having the form piece tiltably mounted with respect of two perpendicular planes towards the frame bridge, as it is generally known as Cardan-joint.

Figure 1:
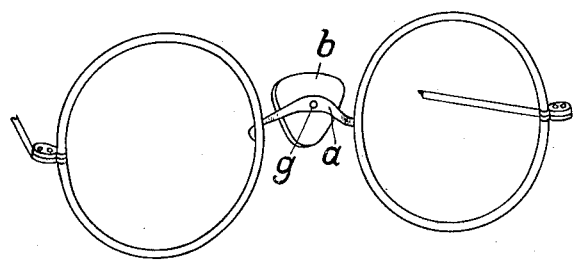
Figure 2:
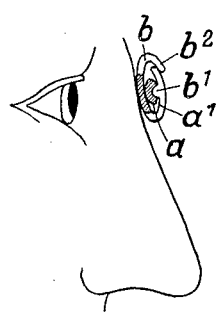
Figure 3:
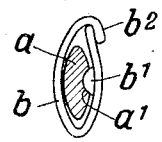

In the drawing enclosed herewith some samples of my invention are demonstrated. Fig. 1 shows a pair of spectacles in front view, whereat the bridge $a$ is provided in the centre with a form piece $b$, which can be adjusted in all planes to the nasal bone and which will be fixed by the fastening screw $g$, after the best accommodation has been tried out. In Fig. 2 a side view is depicted with the frame bridge in proper place on the bearer while the spectacle glasses and the frame are omitted. The bridge $a$ is provided with a spherical groove $a^1$ in which the form piece $b$ will insert with a suitable spherical projection $b^1$, while the form piece is bent with its ends over the bridge $a$ and will close upon itself by the hook part $b^2$. In an enlarged scale the same details are to be seen in Fig. 3.

The spherical surfaces $a^1$ $b^1$ between the form piece and the bridge allow a universal tilting of one part toward the other. There is no difficulty though in changing the projection to the bridge and forming the groove in the form piece; or the intersecting action may be brought to the inner side between the bridge and the form piece, which is but less advisable, as in the case of using the spectacles without the form piece, the projection will be pressed into the nasal bone and might give pain to the bearer. In order to prevent an unwanted parting of the piece, the hook shape $b^2$ will be brought over the upper end of the form piece, closing the same upon itself and permitting sure and easy adjustment for anybody.

Figure 4:
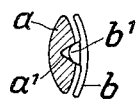

Fig. 4 shows a like connection between the bridge $b$ and the form piece $a$, whereby the intersecting parts $a^1$ and $b^1$ are shaped conically.

Figure 5:
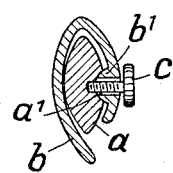

Fig. 5 demonstrates such a bridge support, whereby over the bridge $a$ the form piece $b$ is bent, intersecting with spherical projection $b^1$ into the groove $a^1$ of the bridge; with the aid of the fastening screw $c$ the parts will be pressed together for lasting use; instead of the screw any other clamping device may be used.

Figure 6:
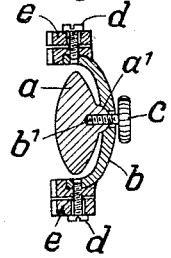

An alteration is to be seen in Fig. 6 whereby the form piece $b$ is provided with two movable supports $e$, each upon the upper and lower end of it; they come to bear upon the nasal bone and are attached to the form piece $b$ by two screws $d$ so they may move in every plane.

Figure 7:
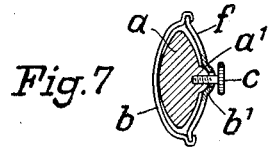

Another alteration in Fig. 7 is depicted. The bridge $a$ has the supporting form piece $b$ ending in shape of hooks, into which the outer part $f$ of the form piece is to be inserted. A universal joint $a^1$ $b^1$ with fastening screw $c$ will allow a perfect adjustment to the need of every bearing person.

Having now particularly described and ascertained the nature of my said invention and in what manner the same is to be performed, I declare that what I claim is:

1. In combination with the bridge of spectacle and eyeglass frames, and with a cavity in the front of the bridge, a nose rest located at the inner side of the bridge and overlapping it so as to extend also to the front of the same, and a projection provided at the rear side of the overlapping nose rest portion and engaging said cavity so as to permit universal movement of the said rest at the said bridge.

2. In combination with the bridge of spectacle and eyeglass frames, and with a cavity in the front of the bridge and a threaded bore in the centre of said cavity, a nose rest located at the inner side of the bridge and overlapping it so as to extend also at the front of the same, and a projection provided at the rear side of the overlapping nose rest portion and engaging said cavity so as to permit universal motion of the said rest at the said bridge, and having a non-threaded bore opposite to the said threaded bore, and a screw extending through the first-mentioned bore into the other one.

3. In combination with the bridge of spectacle and eye glass frames, a nose rest located at the inner side of the bridge and overlapping it from above and from below; a web located at, and extending across, the outer side of the bridge and engaging with its ends the ends of said nose rest, said web and the bridge being coupled with one another by a universal joint comprising a projection in one of these members, a cavity receiving said projection in the other of those members, a threaded bore in the centre of said projection, a non-threaded bore located opposite to said threaded one in said cavity, and a screw extending through this bore into the threaded one.

4. In combination with the bridge of spectacle and eye-glass frames and with a cavity in the front of the bridge, a nose rest located at the inner side of the bridge and overlapping it at both its ends so as to extend also to the front of the same, and a projection provided at the rear side of one of said overlapping nose rest portions and engaging said cavity so as to permit universal movement of the said rest at the said bridge.

5. In combination with the bridge of spectacles and eye-glass frames and with a cavity in the front of the bridge, a nose rest located at the inner side of the bridge and overlapping it at both its ends so as to extend also to the front of the same, said overlapping ends being coupled with one another, and a projection provided at the rear side of one of said overlapping nose rest portions and engaging said cavity so as to permit universal movement of the said rest at the said bridge.

6. In combination with the bridge of spectacle and eye-glass frames and with a cavity in the front of the bridge, a nose rest located at the inner side of the bridge and overlapping it at both its ends so as to extend also to the front of the same, and a projection provided at the rear side of one of said overlapping nose rest portions and engaging said cavity so as to permit universal movement of the said rest at the said bridge, one of said overlapping ends forming a hook and the other end engaging said hook.

FRITZ BOCK.